United States Patent
Sapiano et al.

(10) Patent No.: US 9,781,635 B2
(45) Date of Patent: Oct. 3, 2017

(54) BASE STATION PROVIDING HANDOVER AMONG SMALL CELLS

(71) Applicant: Alcatel Lucent, Boulogne Billancourt (FR)

(72) Inventors: Philip Sapiano, Swindon (GB); Stephen Bearcroft, Swindon (GB)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 15/022,679

(22) PCT Filed: Aug. 18, 2014

(86) PCT No.: PCT/EP2014/002259
§ 371 (c)(1),
(2) Date: Mar. 17, 2016

(87) PCT Pub. No.: WO2015/043703
PCT Pub. Date: Apr. 2, 2015

(65) Prior Publication Data
US 2016/0234723 A1 Aug. 11, 2016

(30) Foreign Application Priority Data
Sep. 25, 2013 (EP) .................................... 13306308

(51) Int. Cl.
*H04W 36/00* (2009.01)
*H04W 84/04* (2009.01)

(52) U.S. Cl.
CPC ... *H04W 36/0016* (2013.01); *H04W 36/0055* (2013.01); *H04W 36/0072* (2013.01); *H04W 36/0061* (2013.01); *H04W 84/045* (2013.01)

(58) Field of Classification Search
CPC ......... H04W 36/0016; H04W 36/0055; H04W 36/0061; H04W 36/0072; H04W 84/045
USPC ................. 455/436, 438, 439, 444
See application file for complete search history.

(56) References Cited

U.S. PATENT DOCUMENTS

| 7,933,600 B2* | 4/2011 | Miklos | H04W 36/18 455/436 |
| 2008/0171554 A1* | 7/2008 | Chao | H04L 1/0003 455/455 |

(Continued)

FOREIGN PATENT DOCUMENTS

| EP | 1 773 075 A2 | 4/2007 |
| WO | WO 2005/125260 A1 | 12/2005 |
| WO | WO 2011/160120 A1 | 12/2011 |

OTHER PUBLICATIONS

Universal Mobile Telecommunications System (UMTS); UTRAN architecture for 3G Home Node B (HNB); Stage 2 (3GPP TS 25.467 Version 10.6.0 Release 10), Oct. 2012.*

(Continued)

*Primary Examiner* — Khai M Nguyen
(74) *Attorney, Agent, or Firm* — Fay Sharpe, LLP

(57) ABSTRACT

A source base station method, a source base station, a target base station method, a target base station and computer program products are disclosed. The source base station method comprises: in response to receiving an identification message from a user equipment being served by the serving base station identifying a target base station detected by the user equipment, transmitting a prepare message to the target base station requesting the target base station allocate but not utilise resources to support communication with the user equipment; and transmitting an active set update message to the user equipment instructing the user equipment to add the target base station to its active set. In this way it can been seen that functionality employed during hard handover is used in order to provision the target base station, but that soft handover procedures are used towards the user equipment. This means that the target base station is able to be rapidly handed over to when required, since it has already been provisioned and configures the user equipment to be expect- (Continued)

ing transmissions from the target base station when required. This enables a more simplified base station to be provided which need not provide all the functionality for soft handover. Also, because no soft handover is required, limited additional resources are required over the backhaul, and the processor and memory requirements are less intensive.

13 Claims, 4 Drawing Sheets

(56) References Cited

U.S. PATENT DOCUMENTS

| | | | |
|---|---|---|---|
| 2008/0261599 A1 | 10/2008 | Mohanty et al. | |
| 2009/0141684 A1* | 6/2009 | Hashimoto | H04W 36/02 370/331 |
| 2011/0028151 A1* | 2/2011 | Wager | H04W 36/0083 455/436 |
| 2011/0223917 A1 | 9/2011 | Gao et al. | |
| 2012/0281544 A1* | 11/2012 | Anepu | H04B 7/0632 370/241 |

OTHER PUBLICATIONS

"Universal Mobile Telecommunications System (UMTS); UTRAN architecture for 3G Home Node B (HNB); Stage 2 ((3GPP TS 25.467 version 10.6.0 Release 10)," pp. 1-63, XP014075339, (Oct. 2012).

International Search Report for PCT/EP2014/002259 dated Oct. 16, 2014.

* cited by examiner

BASE STATION PROVIDING HANDOVER AMONG SMALL CELLS

FIELD OF THE INVENTION

The present invention relates to a source base station method, a source base station, a target base station method, a target base station and computer program products.

BACKGROUND

Wireless telecommunication networks are known. In such networks, mobile communication devices (for example, mobile telephones) are operable to communicate with base stations provided by network providers.

In known wireless telecommunication networks, radio coverage is provided to network connectable devices, such as mobile telephones, or wireless devices such as tablets, within areas known as cells. A base station is located in each cell to provide radio coverage. Typically, network connectable devices in each cell are operable to receive information and data from a base station and to transmit information and data to a base station.

User equipment roam through the wireless communications network. Base stations are typically provided which support areas of radio coverage. A number of such base stations are provided and are distributed geographically in order to provide a wide area of coverage to user equipment.

When user equipment is within an area served by a base station, communications may be established between the user equipment and the base station over associated radio links.

Traditional base stations provide coverage in relatively large geographical areas and those cells are often referred to as macro cells. It is possible to provide a heterogeneous network (HetNet) where smaller-sized cells are provided within macro cells, as illustrated in FIG. 1. Such smaller sized cells are sometimes referred to as low-power nodes (LPN), home nodeBs (HNB) micro cells, pico cells or femto cells. One way to establish a small cell is to provide a small cell base station that provides coverage having a relatively limited range within the coverage area of the macro cell. The transmission power of a small cell base station is relatively low and, hence, each small cell provides a small coverage area compared to that of a macro cell and covers, for example, an office or a home.

Such small cells are typically provided where the communications coverage provided by the macro cell is poor or where a user wishes to use an alternative communications link provided locally, by the small cell base station, to communicate with the core network, and/or to increase capacity within a network.

Deployment of small cells in a wireless communication network can assist a network in relation to handling capacity in high traffic areas, for example, so-called hot spot areas. An ability to offload traffic to a small cell or cells located in a high traffic area of a network may be particularly useful to a network operator.

Although HetNet deployments may offer advantages, unexpected consequences of such deployments may occur. It is desired to address those consequences.

"UMTS; UTRAN architecture for 3G home node B stage 2" (3GPP TS25.467 version 10.6.0 release 10) discloses a way of providing soft handovers between small cell base stations via an Iurh interface, which involves a target cell being added to an active set of a UE under control of the serving node.

EP1773075 discloses a fast cell selection method for high speed downlink packet access system, in which a target node is detected and a radio link is established between the terminal and the target base station and the terminal updates its active set with the target base station. This is done under control of the serving radio network control.

WO2005/125260 relates to a system where handover is controlled centrally and discloses a smooth hard handover method in which radio links are prepared in selected base stations for potential communication with a mobile station. A radio link in the prepared state will have a dedicated physical control channel set up but not a dedicated physical data channel. The dedicated physical channel control need be set up only in the downlink direction.

SUMMARY

According to a first aspect, there is provided a source base station method, comprising: in response to receiving an identification message from a user equipment being served by said serving base station identifying a target base station detected by said user equipment, transmitting a prepare message to said target base station requesting said target base station allocate but not utilise resources to support communication with said user equipment; and transmitting an active set update message to said user equipment instructing said user equipment to add said target base station to its active set; wherein said prepare message indicates that resources allocated to support downlink communication with said user equipment should fail to be utilised to prevent downlink communication between said target base station and said user equipment.

The first aspect recognises that whilst using so-called "hard" handover as a means for handover between base stations such as, for example, small cell base stations, has the advantage of being simple and efficient, this also has the drawback of having challenging handover success rate key performance indicators (KPIs). This is because with hard handover, the trigger for the handover occurs when the neighbouring cell received common pilot channel (CPICH) strength is already stronger than that of the source cell and the handover message is broadcast through the source cell. This requires that the handover message must be sent through the source cell to the user equipment. However, a small cell topology can result in the signal strength of the source cell deteriorating rapidly (for example, when the user moves between a physical partition, such as a door, with different cells providing coverage on either side of the door). At the same time that the source cell deteriorates, the target cell rapidly increases, and when the two cells perform co-channel transmission this results in an interference level which further exacerbates the deterioration of the quality of the source or serving cell seen by the user equipment. Also, the handover preparation takes some time (typically more than 100 milliseconds) and there needs to be enough margin and hysteresis to avoid frequent ping-pong between the source and the target cells. This further prolongs the handover preparation by typically between around 300 milliseconds to 1 second. Furthermore, the handover message is generally large and is transmitted over a low bandwidth channel (typically around 3.4 kbps) and can take hundreds of milliseconds to transmit. This can lead to performance shortfalls when using hard handover in a small cell environment. These factors are illustrated in FIG. 3 and can result in the handover message not reaching the user equipment before the user equipment loses contact with the serving cell, resulting in a call being dropped.

It is possible to implement an Iub architecture for small cells instead of using Iuh and host the small cells via a node similar to a radio network controller. Using that Iub architecture enables so-called "soft" handover to be implemented, which increases the performance of the handover. Recent standards releases (25.467 release 10) have introduced the ability to perform soft handover between small cell base stations via an Iurh interface as shown in FIG. 2. Soft handover allows macro diversity of the dedicated control channel (DCCH) signalling channel which allows the target cell to be prepared in advance, so the control signalling (and user plane data) can go through multiple paths, thus avoiding the problem associated with hard handover where the controlling cell quality becomes too poor to send the handover message. However, the first aspect recognises that this approach has a number of drawbacks. First, it is a very complex software architecture enhancement to make to existing base stations not designed to support soft handover. The approach also requires additional resources over the backhaul, is processor and memory intensive, and introduces user plane delay due to synchronisation and frame combining.

Accordingly, a method for a base station is provided. The method may comprise the step of, when an identification message is received from a user equipment being served by the serving base station which identifies a target base station which has been detected by the user equipment, transmitting a prepare message to the target base station. The prepare message may request that the target base station allocates or provisions resources to support communication with the user equipment for future handover. The prepare message may also request that the target base station does not utilise, employ or make use of those radio resources to support communication with the user equipment. In other words, the prepare message provisions the target base station to support future communication with the user equipment, but prevents those resources from being activated. The method may also comprise the step of transmitting an active set update message to the user equipment. The active set update message may instruct the user equipment to add the radio resources prepared by the target base station to its active set. At a later stage, the user equipment may indicate a trigger that the target base station is better quality than the source base station, and the source base station in turn may hand over control to the target base station. The target base station may use the radio resources previously added into the user equipment active set to take control of the user equipment. In this way it can been seen that functionality employed during hard handover is used in order to provision the target base station, but that soft handover procedures are used towards the user equipment. This means that the target base station is able to be rapidly handed over to when required, since it has already been provisioned and configures the user equipment to be expecting transmissions from the target base station when required. This enables a more simplified base station to be provided which need not provide all the functionality for soft handover. Also, because no soft handover is required, limited additional resources are required over the backhaul, and the processor and memory requirements are less intensive.

In one embodiment, the source sends a prepare message to the target in response to a measurement report from the user equipment indicating that the quality of the target exceeds a threshold (and so is becoming significant—such as, for example, a measurement report from the user equipment showing that the target is within a defined range of the source quality).

In one embodiment, the prepare message indicates that resources allocated to support downlink communication with the user equipment should fail to be utilised by setting downlink communication power to substantially zero. Hence, the downlink to the user equipment may be prevented by setting the transmission power of the downlink to zero.

In one embodiment, the prepare message includes information to enable the target base station to support communication with the user equipment. Accordingly, the prepare message includes that configuration information necessary to ensure that the target base station can be configured to support communication with the user equipment.

In one embodiment, the method comprises following transmission of the prepare message, preventing transmission of user plane data to the target base station. Accordingly, the transmission of user plane data to the target base station may be inhibited.

In one embodiment, step of transmitting the active set update message initiates soft handover functionality in the user equipment with the serving base station and the target base station. Accordingly, the providing of the active set update message may cause the user equipment to initiate a soft handover procedure with both the serving base station and the target base station. Hence, the user equipment may be configured to accept transmissions from either base station, and so becomes no longer reliant on receiving a handover message from the serving base station.

In one embodiment, the active set update message includes information to enable the user equipment to support communication with the target base station. Accordingly, the active set update message may include configuration information which enables the user equipment to be configured to support communication with the target base station.

In one embodiment, the method comprises in response to a measurement message from the user equipment identifying that the user equipment would be better served by the target base station, transmitting a handover message to the target base station to cause the target base station to attempt to serve the user equipment. Hence, when a message (such as, for example, a measurement report from the user equipment) is received which indicates that a stronger signal is being received from the target base station, a handover message may be transmitted to the target base station which initiates handover of the user equipment to the target base station.

In one embodiment, the target base station then transmits a user equipment handover message to the user equipment to handover the user equipment to the target base station.

In one embodiment, the method comprises ceasing transmission of downlink with the user equipment in the source base station. Accordingly, when handover to the target base station has occurred, transmission of the downlink with the user equipment from the source base station may be terminated.

According to a second aspect, there is provided a source base station, comprising: transmission logic operable, in response to receiving an identification message from a user equipment being served by said serving base station identifying a target base station detected by said user equipment, to transmit a prepare message to said target base station requesting said target base station allocate but not utilise resources to support communication with said user equipment, said prepare message indicating that resources allocated to support downlink communication with said user equipment should fail to be utilised to prevent downlink communication between said target base station and said user equipment; and to transmit an active set update message to said user equipment instructing said user equipment to add said target base station to its active set.

In one embodiment, the prepare message indicates that resources allocated to support downlink communication with the user equipment should fail to be utilised by setting downlink communication power to substantially zero.

In one embodiment, the prepare message includes information to enable the target base station to support communication with the user equipment.

In one embodiment, the transmission logic is operable, following transmission of the prepare message, to prevent transmission of user plane data to the target base station.

In one embodiment, the active update set message initiates soft handover functionality in the user equipment with the serving base station and the target base station.

In one embodiment, the active set update message includes information to enable the user equipment to support communication with the target base station.

In one embodiment, the transmission logic is operable, in response to a measurement message from the user equipment identifying that the user equipment would be better served by the target base station, to transmit a handover message to the target base station to cause the target base station to attempt to serve the user equipment.

In one embodiment, the handover message causes the target base station to transmit a user equipment handover message to cause the user equipment to handover to the target base station.

In one embodiment, the transmission logic is operable to cease transmission of downlink with the user equipment.

According to a third aspect, there is provided a target base station method, comprising: receiving a prepare message from a source base station, said prepare message indicating that resources allocated to support downlink communication with said user equipment should fail to be utilised to prevent downlink communication between said target base station and said user equipment; and in response to said prepare message, allocating, but not utilising, resources to support communication with user equipment and not utilising said resources allocated to said downlink communication with said user equipment to prevent downlink communication between said target base station and said user equipment.

In one embodiment, the prepare message indicates that resources allocated to support downlink communication with the user equipment should fail to be utilised by setting downlink communication power to substantially zero.

In one embodiment, the prepare message includes information to enable the target base station to support communication with the user equipment.

In one embodiment, the method comprises receiving a handover message from the source base station; and in response to the handover message, attempting to serve the user equipment.

In one embodiment, the method comprises in response to the handover message, transmitting a user equipment handover message to cause the user equipment to handover to the target base station.

According to a fourth aspect, there is provided a target base station, comprising: reception logic operable to receive a prepare message from a source base station said prepare message indicating that resources allocated to support downlink communication with said user equipment should fail to be utilised to prevent downlink communication between said target base station and said user equipment and, in response to said prepare message, to allocate, but not utilise, resources to support communication with user equipment and to not utilise said resources allocated to said downlink communication with said user equipment to prevent downlink communication between said target base station and said user equipment.

In one embodiment, the prepare message indicates that resources allocated to support downlink communication with the user equipment should fail to be utilised by setting downlink communication power to substantially zero.

In one embodiment, the prepare message includes information to enable the target base station to support communication with the user equipment.

In one embodiment, the reception logic is operable to receive a handover message from the source base station and, in response to the handover message, to attempt to serve the user equipment.

In one embodiment, the reception logic is operable, in response to the handover message, to transmit a user equipment handover message to cause the user equipment to handover to the target base station.

According to a fifth aspect, there is provided a computer program product operable, when executed on a computer, to perform the method steps of the first or third aspects.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF THE EMBODIMENTS

Overview

Figure 1:
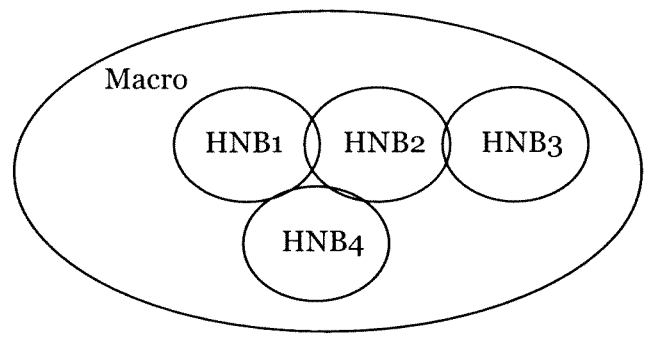
FIG. 1 illustrates an example HetNet according to one embodiment.
Figure 2:
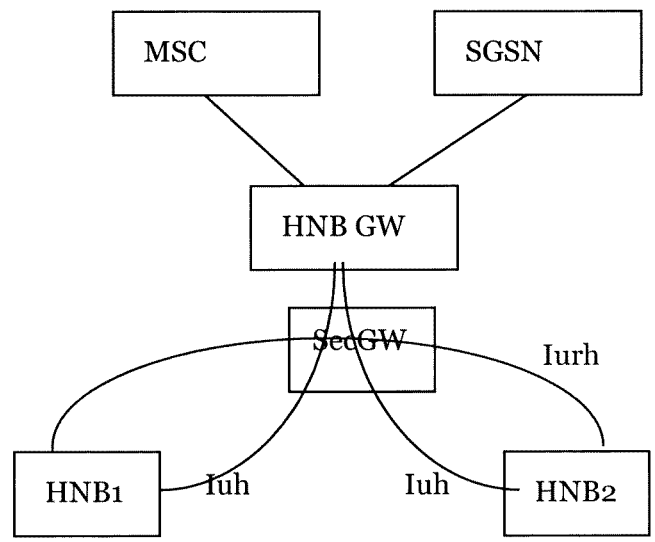
FIG. 2 illustrates signalling via an Iurh interface.
Figure 3:
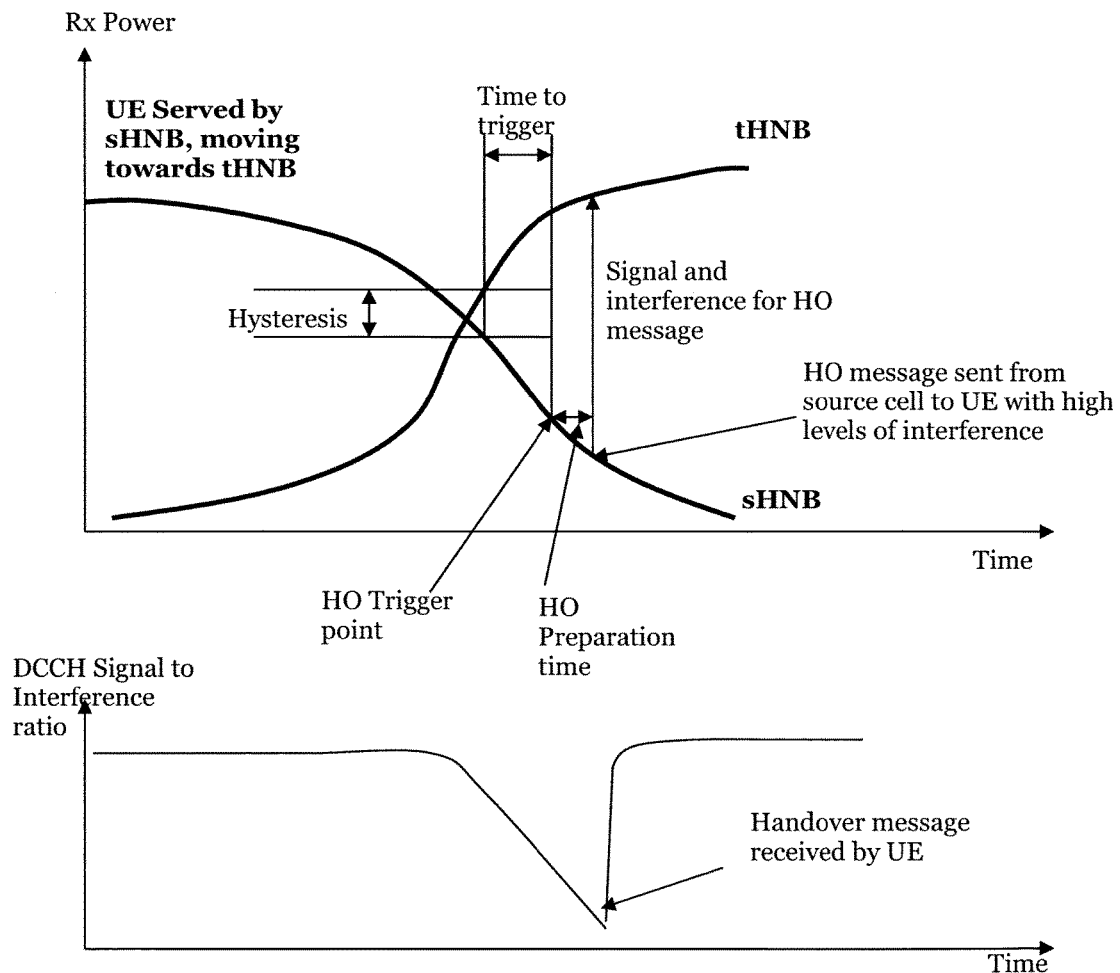
FIG. 3 illustrates signal levels during handover.
Figure 4:
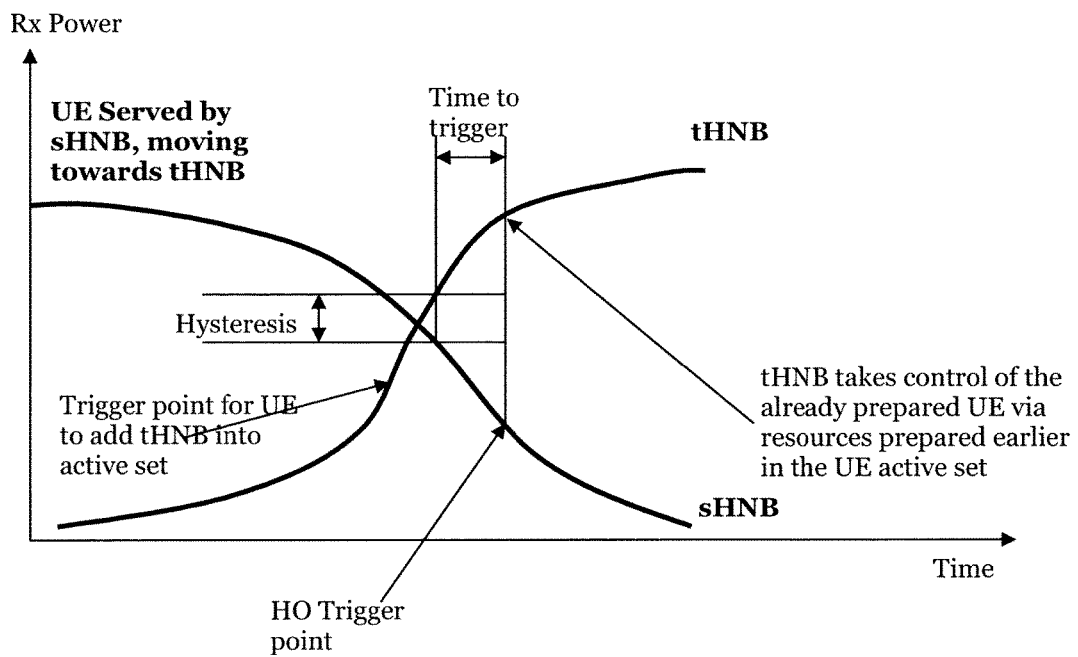
FIG. 4 illustrates signal levels during handover according to one embodiment.

Before discussing the embodiments in any more detail, first an overview will be provided. Embodiments provide a technique which uses soft handover procedures towards the user equipment, but with hard handover procedures within the small cells, in order to provide path diversity for the signalling channel, yet keeping a simple architecture. As shown in FIG. 4, the basic approach is that when user equipment detects a neighbouring cell (which is at a point which is typically below the signal level of the serving cell) the serving small cell base station sends an active set update towards the user equipment to make it think that it is in soft handover with the target cell. However, instead of initiating a soft handover procedure with the target small cell base station, in reality all that has happened is that the small cell base station has simply prepared resources in the target small cell base station, but nothing (not user data) is sent or transmitted from that neighbouring cell. Instead, the target small cell base station simply provisions the resources for transmission with the user equipment, but does not utilise these resources.

Doing this causes no functional difficulties to the user equipment because, to the user equipment, the target cell will look like a cell in the active set with a power which is very low—this is not unusual in macro cell operation and in this case the user equipment only acts on the cell it can detect (i.e., Transmitter Power Control (TPC) commands, decode the Transport Format Combination Indication (TFCI), etc.). Although the user equipment has been configured for soft handover, the target base station is not operating in soft handover, but is now configured to handover almost immediately and is even able to monitor for uplink synchronisation and transmissions from the user equipment.

When the user equipment indicates that the neighbouring target cell is stronger than the source cell, the source small cell base station passes control of the call to the target small cell base station. In order to do this, the target small cell base station is informed of the current state information of the user equipment in the source cell, including the current Radio Link Control (RLC) sequence numbers. The target cell can then communicate with the user equipment using the already prepared configuration.

As the user equipment has already been prepared with the target configuration whilst the serving cell was good quality, the switch from the source to the target configuration is more reliable than would be achieved by hard handover since that information would need to come from the source or serving cell, which may be poorly received by the user equipment. This approach is compliant with 3GPP user equipment standard procedures from Release-99. However, a new message would be required for the message which prepared resources in the neighbouring target small cell base station and subsequent handshaking.

Example Operation

Figure 5:
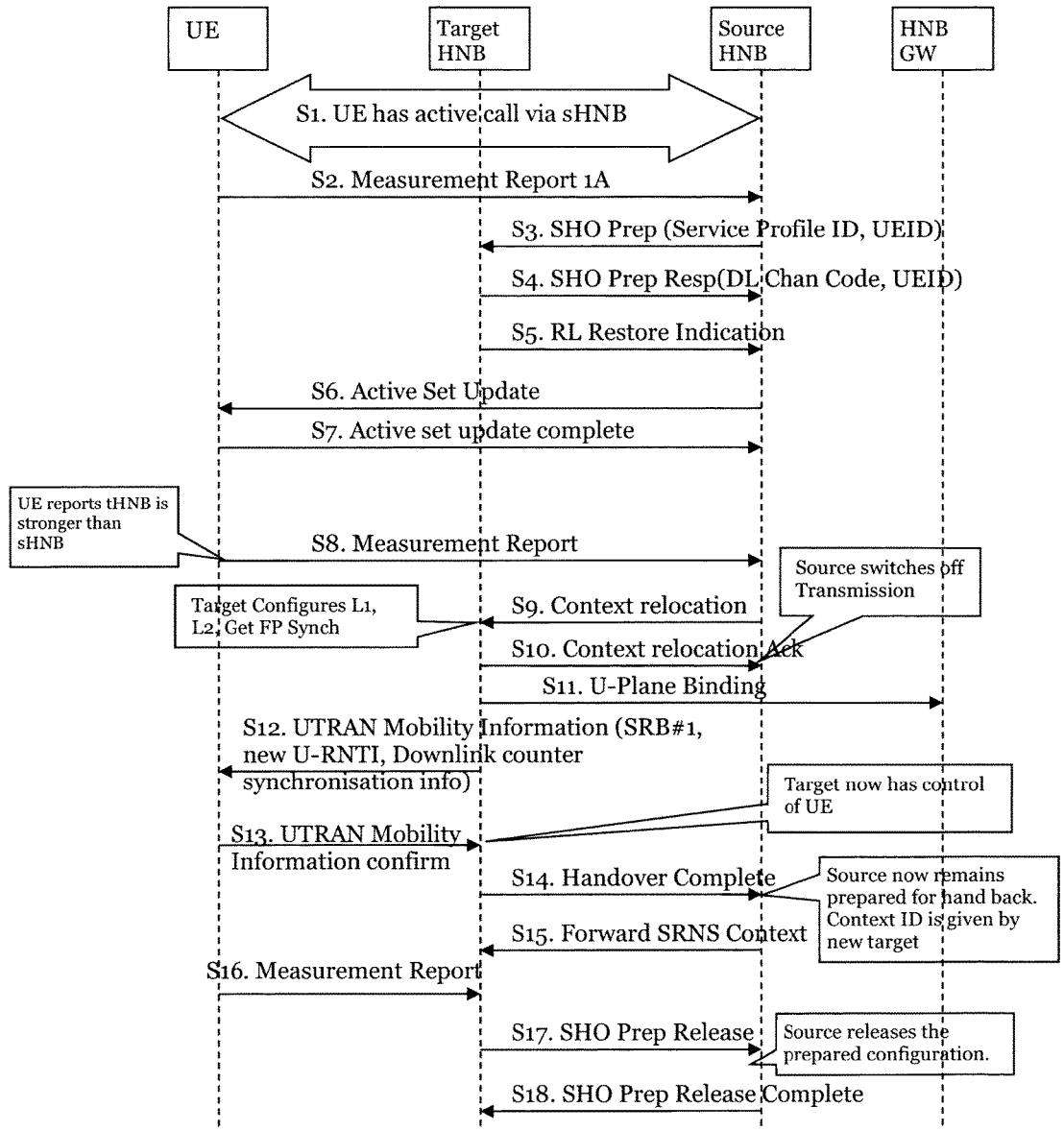
FIG. 5 illustrates the messaging between network nodes according to one embodiment.

FIG. 5 illustrates the messaging between network nodes according to one embodiment. At step S1, the user equipment is in an active call with a small cell base station (in this case a home nodeB (HNB)) known as the serving HNB (sHNB). The user equipment is instructed to report monitored neighbours detected when they are within a certain detection range. This is typically a 1A measurement report from the user equipment as defined in 3GPP TS 25.331.

At step S2, the user equipment detects a neighbouring cell target (tHNB) and reports it through the 1A measurement report to the sHNB. This indicates that the cell is detected, but not that the detected cell is the strongest cell.

At step S3, the sHNB requests resources in the tHNB via a soft handover preparation procedure message, providing the tHNB with information about the physical channel configuration of the user equipment and that the link is in preparation for switched link diversity. The tHNB reserves the resources for the connection in anticipation of subsequent control of the user equipment and sets up the uplink physical layer resources to decode the uplink Dedicated Physical Control Channel (DPCCH) of the user equipment and to detect synchronisation.

At step S4, the tHNB responds back to the sHNB indicating that the soft handover preparation procedure was successful and the downlink physical layer resources have been allocated for the user equipment.

At step S5, when the tHNB detects synchronisation of the user equipment's uplink DPCCH, it indicates to the sHNB that synchronisation is achieved. This can be used by the sHNB as indication that the correct target is selected and is particularly useful in the case where there may be primary scrambling code confusion due to multiple HNB neighbours sharing the same primary scrambling code.

At step S6, the sHNB informs the user equipment of the new physical layer configuration of the tHNB through the active set update procedure. The user equipment will then consider both the sHNB and the tHNB links for soft handover. However, because the tHNB is not transmitting the downlink physical layer, the user equipment will regard this as a soft handover leg of weak strength and will not decode the data. Therefore, at this stage the user equipment will be decoding the transmissions from the sHNB. The user equipment will not decode Dedicated Physical Data Channel (DPDCH) (data) or DPCCH (physical layer control) of the tHNB.

At step S7, the user equipment responds with an active set update complete message to indicate the successful addition of tHNB into the active set.

At step S8, the user equipment detects that the CPICH of the tHNB is stronger than the CPICH of the sHNB and triggers a measurement report to inform the sHNB of this event. This is a 1D measurement report, as defined in 3GPP TS 25.331.

At step S9, the event 1D triggers the sHNB to attempt to move control of the call from itself to tHNB, which is more suitable. Accordingly, a context relocation message is transmitted which provides the tHNB with information on the current user equipment state which has not previously been communicated. Such information may include: the RLC sequence numbers in each of the RLC entities; ciphering and integrity protection counters; and/or potentially any buffered user plane data. The tHNB configures itself with the RLC and ciphering states communicated by the sHNB.

At step S10, the tHNB indicates that the relocation is in progress and the sHNB stops transmitting in the downlink in order to not confuse the user equipment with conflicting control information with the source cell.

At step S11, the tHNB (or alternatively, sHNB) indicates to the HNB gateway that the user equipment control has moved from the sHNB to the tHNB. This then triggers the HNB gateway to route user plane and control messages intended for the user equipment to the tHNB.

At step S12, the tHNB reconfigures the user equipment with a Universal Terrestrial Radio Access Network (UTRAN) mobility information message on the dedicated control channel using the communicated RLC sequence number and ciphering configuration, which triggers the user equipment to re-establish RLC on the radio bearers and take a new UTRAN Radio Network Type Identifier (U-RNTI).

At step S13, the user equipment responds with a UTRAN mobility information confirm message to indicate the new configuration. At this stage, the small cell may reconfigure High Speed Downlink Packet Access (HSDPA) and enhanced dedicated channel (E-DCH) on the user equipment to move to the new serving cell through a separate radio bearer reconfiguration message.

At step S14, the tHNB indicates completion of the procedure to the sHNB. The sHNB still maintains its physical layer resources for the user equipment until the sHNB is taken out of the active set of the user equipment.

At step S15, the old source cell (sHNB) forwards any outstanding information such as Non Access Stratum (NAS) Messages/Radio Access Network Application Part (RANAP) messages, etc.

At step S16, the user equipment reports that sHNB CPICH is lower than the tHNB CPICH by a margin.

At step S17, the tHNB informs the sHNB to release its resources for the user equipment.

At step S18, the sHNB confirms to the tHNB that the resources have been released and that the soft handover preparation release procedure is complete.

Alternative Embodiments

In one embodiment, when the tHNB attempts to take control of the UE, it may attempt a simpler route than attempting to resume the RLC state in the sHNB, and may initiate a reset on all Signalling Radio Bearers (SRB) to set the sequence numbers back to a fresh value of zero, thus simplifying the procedure.

In one embodiment, untransmitted data in the sHNB may be forwarded to the tHNB for transmission to reduce the userplane interruption. This may be handled independently for circuit switching (CS) and packet switching (PS). For example, CS may be used to fill up the jitter buffer. Alternatively, the HNB gateway could bicast downlink (DL) voice packets for the short interval.

In one embodiment, some improvements may be made for reduction of, for example, voice user plane interruption. This could be coordinated, for example, by the sHNB indicating to the tHNB a connection frame number to switch over on.

In one embodiment, upon reception of the active set update message 3GPP TS 25.331 section 8.3-4.3 describes that the UE shall "perform the physical layer synchronisation procedure B" i.e. from 3GPP TS 25.214. It is not envisaged that the UE should require synchronisation to complete the active set update procedure, but in case it does, it may be required that the tHNB temporarily broadcasts some DL transmission during the active set update procedure until completion.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A source base station method, comprising:
   in response to receiving an identification message from a user equipment being served by said source base station identifying a target base station detected by said user equipment, transmitting a prepare message to said target base station requesting said target base station allocate resources to support communication with said user equipment but not utilise said resources; and
   transmitting an active set update message to said user equipment instructing said user equipment to add said target base station to its active set; wherein
   said prepare message indicates that resources allocated to support downlink communication with said user equipment should fail to be utilised to prevent downlink communication between said target base station and said user equipment.

2. The method of claim 1, wherein said prepare message indicates that resources allocated to support downlink communication with said user equipment should fail to be utilised by setting downlink communication power to substantially zero.

3. The method of claim 1, wherein said prepare message includes information to enable said target base station to support communication with said user equipment.

4. The method of claim 1, comprising:
   following transmission of said prepare message, preventing transmission of user plane data to said target base station.

5. The method of claim 1, wherein transmitting said active set update message initiates soft handover functionality in said user equipment with said serving base station and said target base station.

6. The method of claim 1, wherein said active set update message includes information to enable said user equipment to support communication with said target base station.

7. The method of claim 1, comprising:
   in response to a measurement message from said user equipment identifying that said user equipment would be better served by said target base station, transmitting a handover message to said target base station to cause said target base station to attempt to serve said user equipment.

8. The method of claim 7, wherein said handover message causes said target base station to transmit a user equipment handover message to cause said user equipment to handover to said target base station.

9. The method of claim 1, comprising:
ceasing transmission of downlink with said user equipment.

10. A source base station, comprising:
transmission logic operable, in response to receiving an identification message from a user equipment being served by said source base station identifying a target base station detected by said user equipment, to transmit a prepare message to said target base station requesting said target base station allocate resources to support communication with said user equipment but not utilise said resources, said prepare message indicating that resources allocated to support downlink communication with said user equipment should fail to be utilised to prevent downlink communication between said target base station and said user equipment; and to transmit an active set update message to said user equipment instructing said user equipment to add said target base station to its active set.

11. A target base station method, comprising:
receiving a prepare message from a source base station, said prepare message indicating that resources allocated to support downlink communication with said user equipment should fail to be utilised to prevent downlink communication between said target base station and said user equipment; and in response to said prepare message, allocating resources to support communication with user equipment, but not utilizing said resources, and not utilising said resources allocated to said downlink communication with said user equipment to prevent downlink communication between said target base station and said user equipment.

12. A target base station, comprising:
reception logic operable to receive a prepare message from a source base station said prepare message indicating that resources allocated to support downlink communication with said user equipment should fail to be utilised to prevent downlink communication between said target base station and said user equipment and, in response to said prepare message, to allocate resources to support communication with said user equipment, but not utilise said resources, and to not utilise said resources allocated to said downlink communication with said user equipment to prevent downlink communication between said target base station and said user equipment.

13. A non-transitory computer-usable data carrier storing instructions that, when executed by a computer, cause the computer to perform the method of claim 1.

* * * * *